(12) United States Patent
Dhara

(10) Patent No.: US 7,292,589 B2
(45) Date of Patent: Nov. 6, 2007

(54) FLOW BASED DYNAMIC LOAD BALANCING FOR COST EFFECTIVE SWITCHING SYSTEMS

(76) Inventor: Narendra Kumar Dhara, 3262 Trajan Ct., San Jose, CA (US) 95135

( * ) Notice: Subject to any disclaimer, the term of this patent is extended or adjusted under 35 U.S.C. 154(b) by 667 days.

(21) Appl. No.: 10/219,078

(22) Filed: Aug. 13, 2002

(65) Prior Publication Data

US 2004/0032872 A1 Feb. 19, 2004

(51) Int. Cl.
*H04L 12/28* (2006.01)

(52) U.S. Cl. .............. 370/401; 370/412; 718/105

(58) Field of Classification Search .............. None
See application file for complete search history.

(56) References Cited

U.S. PATENT DOCUMENTS

| | | | |
|---|---|---|---|
| 2004/0030766 A1* | 2/2004 | Witkowski | 709/223 |
| 2005/0023241 A1* | 2/2005 | Goergen | 216/13 |
| 2006/0013240 A1* | 1/2006 | Ma et al. | 370/401 |

* cited by examiner

*Primary Examiner*—Duc Ho (57) ABSTRACT

An apparatus and method for a load balancing system that is resident in line card sub-systems, service processing card sub-systems or other sub-systems of network devices such as routers. In various embodiments of the invention, the load balancing system considers factors in some key system parameters, other than merely internal fabric port speeds, to optimize its mode of operation.

26 Claims, 7 Drawing Sheets

FLOW BASED DYNAMIC LOAD BALANCING FOR COST EFFECTIVE SWITCHING SYSTEMS

BACKGROUND

1. Field of the Invention

The invention is generally related to networking equipment and services. More particularly, the invention is related to design and operation of edge routers that support high speed interfaces.

2. Related Art

Figure 1:
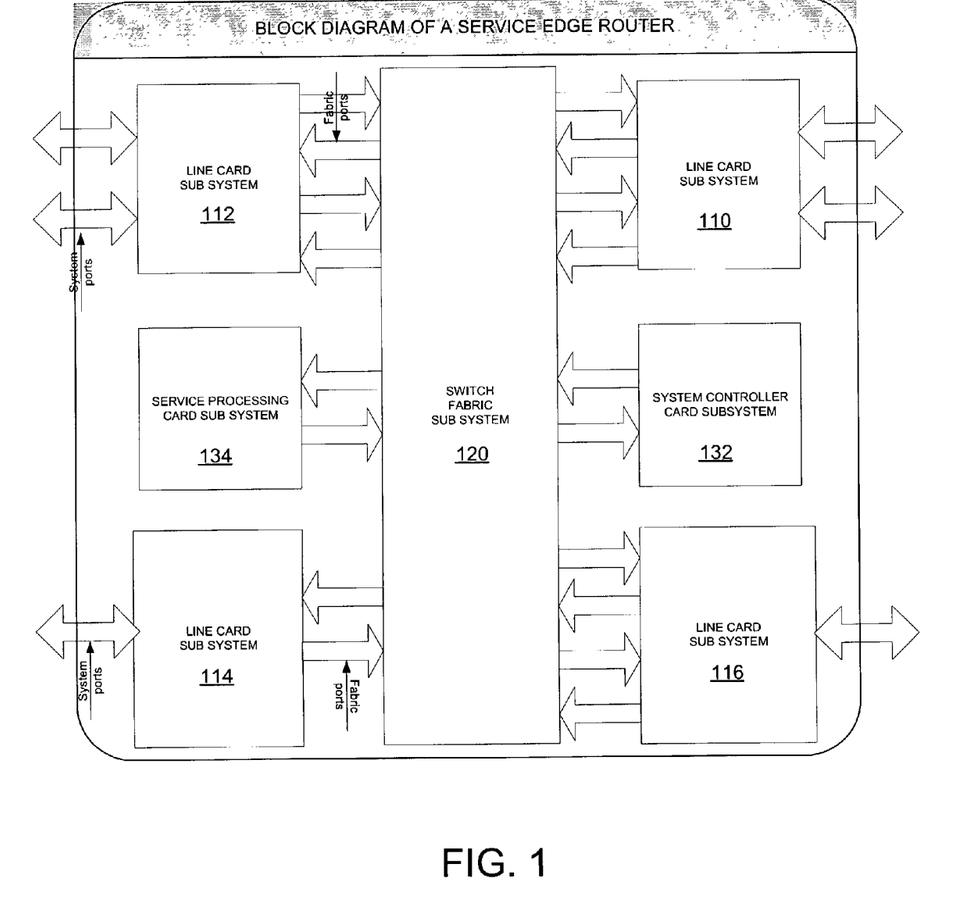
FIG. 1 illustrates an exemplary conventional edge router.

Packet switching communications networks are viewed logically as having core networks, edge networks and subscriber/access networks. One protocol for transmission of data over such networks is the IP (Internet Protocol) standard. The edge network aggregates the packet traffic received from subscriber/access networks and forwards such traffic to the core networks. The edge networks serve as an interface between subscribers and the core networks, which are the backbone networks that function over long distances such as those networks administered by major telecommunications carriers. Edge networks often contain "routers" which are devices that determine what network path particular packets should take going forward given their intended destination, state of the network, packet size etc. An example of an edge router is shown in FIG. 1. The edge router 100 contains a number of different sub-systems which carry out the various router functions.

In edge routers that require the support of high-speed physical interfaces, such routers should be so designed such that they are capable of supporting the same speeds through out all the sub-systems in the router. Consequently, this puts a requirement on the switch sub-system 120 within the edge router 100, for instance, to support switching ports at the same higher speeds. The edge router 100 is shown having the following subsystems:

Line Card sub-systems 110, 112, 114 and 116;
System controller Card sub-system 132;
Service Processing Card sub-system 134; and
Switch Fabric sub-system 120.

Data grams or data traffic (packets or ATM cells that are reassembled into packets inside the line card subsystems) enters the router 100 through physical ports attached to each Line Card sub-system 110, 112, 114 and 116. Each line card sub-system 110, 112, 114 and 116 consists of at least one primary line card and may consist of other associated components such as daughtercards. Depending on the processing needs, each data gram traverses to other sub-systems, such as other Line Cards sub-systems or Service Processing Card sub-systems before going out of the edge router through a physical port attached to another Line Card. A physical port and line card where the data enters the router 100 are respectively referred to as a router ingress port and an ingress line card. Similarly, a physical port and line card where the data leaves the router 100 are respectively referred to as an router egress port and an egress line card.

The Switch Fabric sub-system 120 provides the connecting path between all the other sub-systems in the router 100. Data packets enter the Switch Fabric sub-system 120 from the Line cards or Service Processing Cards through internal ports called fabric ports which are connected therebetween. Ports where the traffic enter the Switch Fabric sub-system 120 are referred to as ingress fabric ports while ports over which the packets leave the sub-system 120 are referred to as egress fabric ports ("egress fabric ports"). Depending upon the destination sub-system, the Switch Fabric sub-system 120 will switch a packet onto an outgoing egress switch port. A switch fabric sub-system 120 will have at least one ingress switch port and one egress switch port for every type of line card or service processing card whose traffic it will switch to other sub-systems.

Thus, referring again to FIG. 1, the line cards of line card sub-system 112 and line card sub-system 114 are ingress line cards while the line cards of line card sub-system 110 and line card sub-system 116 are egress line cards. The same line card can be ingress or egress with respect to a traffic stream depending upon whether that particular traffic stream is entering or leaving the line card sub system. Ingress line cards accept data traffic over router ingress ports and forward traffic therefrom over ingress fabric ports which ingress to the switch fabric sub-system. Egress line cards accept data traffic from the egress fabric ports and forwards it out of the router over router egress ports.

In order to design a system that supports high-speed interfaces such as OC48c (an optical transport standard providing a transfer rate of up to approximately 2.5 Gigabits/second) and OC192 (an optical transport standard providing a transfer rate of up to approximately 10 Gigabits/second), each of the sub-systems in turn must support handling of packets at the same rate. For the Switch Fabric sub-system 120 to switch traffic at such speeds, each of the ingress and egress fabric ports must also be capable of handling packets at the same rate. Problems with the availability of electrical/electronic components (which comprise the network device sub-systems such as line card sub-system) that support high-speed switch ports and the prohibitiveness of the cost of the resulting design are important in design of such routers and network devices. Some possible solutions to these problems include the use of multiple low speed switch (fabric) ports as a substitute for a single high-speed fabric port. For example, multiple lower speed fabric ports, each of which supports OC12c rate (approximately 622 Megabits/second), can replace a single fabric port that would need to support OC48c or OC192c rates. This approach requires load balancing of traffic from the Line cards and service processing cards and other network sub-systems onto the multiple low speed fabric ports. The load balancing solution must take into consideration that the order of packets belonging to a unique IP source and IP destination must be is maintained with in the system. In a switching sub-system, packet ordering is only maintained for traffic originating from a single fabric port. Thus, the load balancing solution must ensure that packet ordering is maintained when traffic is divided onto multiple ports.

It would be desirable to have a router/network device design load balancing solution that addresses the support of a high-speed physical router port/interface with lower speed ports in router/network device sub-systems such as line cards and service processing cards while still maintaining packet ordering.

SUMMARY

The invention in various embodiments discloses a load balancing system that can be used in a network device sub-system interfacing to and processing data from a higher speed capable network device ports to lower speed fabric ports completely internal to the device which may run among the sub-systems of the network device. The load balancing system uses a combination of techniques including:

(1) A classifier to distinguish traffic flows from different end user equipment even those that are behind NAT gateways thereby making realistic conclusions on the minimum rates that the device-internal sub-system fabric ports must support.

(2) Port selection logic that considers a history of selection results per fabric port and the current status of the queue depth at the fabric port. This approach eliminates packet re-ordering in most cases and minimizes re-ordering in the aggregate.

(3) Flow history table which tracks what flows have occurred previously at each fabric port.

The port selection logic works with parameterized values for port queue depth, depth of the flow history table and queue threshold value. This makes the logic flexible for systems that have varied characteristics such as latency, network device-external port rates and available fabric port rates.

In the event of multiple matches, the port selection logic also ensure that it always selects the fabric port with largest available buffer to optimize the use of buffers in the sub-system. The load balancing system described in various embodiments can be deployed within line card, service processing card and other sub-systems that operate within a network device such as an edge network router.

DETAILED DESCRIPTION

The invention is directed toward an apparatus and method for a load balancing system that is resident in line card sub-systems, service processing card sub-systems or other sub-systems of network devices such as routers. In various embodiments of the invention, the load balancing system considers factors in some key system parameters, other than merely internal fabric port speeds, to optimize its mode of operation. This makes the load balancing solution dynamic rather than static. Such parameters include system latency, buffering state at fabric ports and the number of IP flows in a given ingress port are considered in order to derive an optimal load balancing method. The load balancing solution can be programmed with these parameters and can accommodate several combinations of ports feeding into the ingress line card and internal fabric ports resident in the router or network device hosting these line cards. Load balanced packets which exit the router or network device for instance, through egress line cards will be re-combined in the egress line card after going through the switch fabric sub-system.

The term "fabric ports" are used to describe those ports that interconnect various sub-systems, such as line card sub-systems, service processing card sub-systems and switching sub-systems, that operate within a router or network device.

The load balancing system classifies incoming data packets based on a set of IP header fields. The classified packet flows or "IP" flows are then load balanced onto a plurality of fabric ports. The classification scheme considers the following fields—Source IP Address , Source Port and the Protocol. The Protocol field differentiates among TCP (Transmission Control Protocol), UDP (User Datagram Protocol) and other higher level transport mechanisms operating over IP. The Source Port ID then identifies numerically the "port" over which the mechanism identified in the Protocol field operates. This classification scheme will maintain at the least the necessary distinction between traffic flows, including flows originating and terminating behind a NAT (Network Address Translation) gateway. Other advantages to such a classification scheme is the ability to correlate a given IP flow to a particular end-user (subscriber) computer or end subscriber device and make a realistic conclusion in designing the load balancing system as regards the speed of the internal fabric ports.

With a classification scheme such as that described as above, a single IP flow would normally not be expected to exceed an OC12c rate in the current state of real-life deployed networks. The internal fabric port speed would thus be ordinarily bounded at such a rate, statistically speaking. Thus, the number of internal fabric ports needed to support a router ingress port incoming to a line card sub-system can determined in advance with a reasonable degree of certainty.

The load balancing system is designed to minimize the scattering of packets within a given IP flow ("breaks") onto different fabric ports as this will result in packet re-ordering within the system. The load balancing system consists of a classifier, port selector and port queues for each of the fabric ports. The classifier identifies unique IP flows based on the above criteria and the port selector selects and directs the flow to one of the fabric ports. For each packet entering the classifier, the classifier generates a flow identifier, which is a bit stream comprising of the identifying header fields. The flow identifier along with the packet is sent to the port selector.

The port queues temporarily hold packets in the line card sub-system or other router sub-system before forwarded to other sub-systems (via the switching sub-system) in the router. The port queues provides temporary buffering to handle congestion inside the switching sub-system which prevent immediate flow thereto. The load balancing system also provides a feedback path from the port queues to inform the port selector on the current status of each queue. The port selector will use this queue status as one of the criteria in selecting which fabric port to use as discussed in greater detail below.

Figure 2:
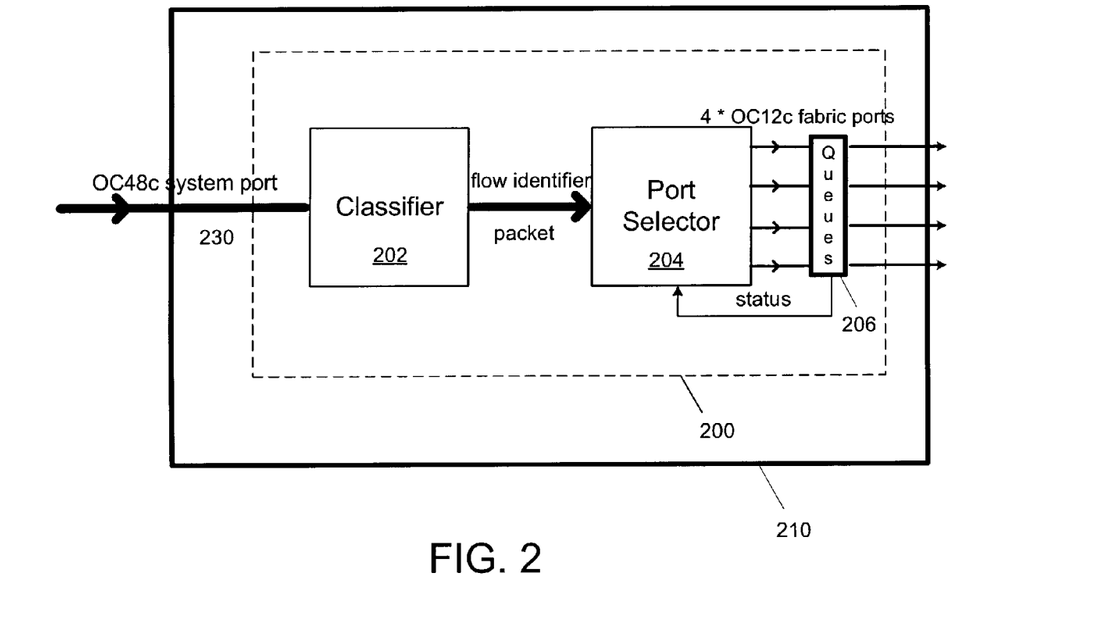
FIG. 2 illustrates an exemplary load balancing system used in a network device according to at least one embodiment of the invention.

FIG. 2 illustrates an exemplary load balancing system used in a line card sub-system or other network device sub-system according to at least one embodiment of the invention. As shown, load balancing system 200 can load balance traffic incoming on a OC48c-capable router port within the line card sub-system 210 in which it is implemented and selectively place such traffic onto four OC12c-capable fabric ports. A line card sub-system 210, for example, that includes in its design the load balancing system 200, can thus accept traffic from OC48c router ports and forward such traffic onto a switch fabric sub-system that is designed with only OC12c fabric ports. The load balancing system consists of a classifier 202 and a port selector 204 and a series of queues 206. Classifier 202 classifies packets incoming over router port 230 into one or more IP flows assigning a flow identifier to each packet. The flow identifier is forwarded along with the packet to port selector 204. Port selector 204 places the packet onto one of the queues 206 for transmission to the fabric port associated therewith.

Figure 3:
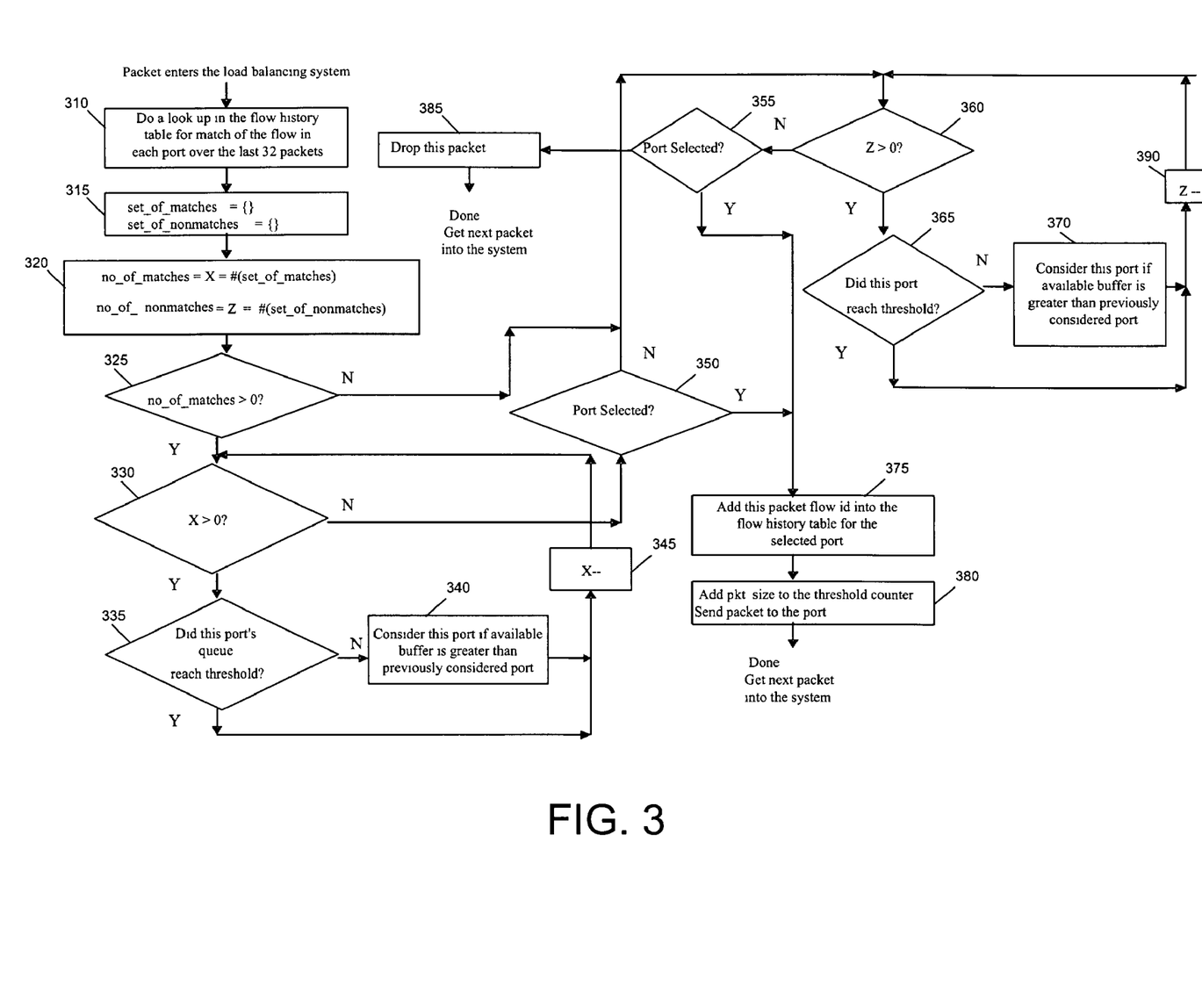
FIG. 3 illustrates an exemplary port selection algorithm according to at least one embodiment of the invention.

As discussed above, in most cases, the IP flows when classified with the above criteria will not exceed the OC12c rate. The port selector 204 is designed to minimize/eliminate scattering of packets in a given IP flow onto different fabric ports there by ensuring packet ordering in the router itself. By using more classification parameters, the line card and service processing sub-systems and router can use even lower speed fabric ports and still ensure the packet ordering. The independent queues 206 attached to each of the fabric ports will temporarily store packets as needed. Each of the queues 206 depth status is fed back to the port selection logic in port selector 204. The port selection logic in port selector 204 utilizes this information feedback and feeds it to an algorithm that determines how the next fabric port is chosen. An exemplary port selection algorithm is illustrated in FIG. 3.

The load balancing system port selection algorithm operates on the principle that packets belonging to an IP flow should be sent, if possible, to the same fabric port to prevent packet re-ordering within the router. The load balancing system minimizes the number of "broken flows" that could occur under most conditions. A "flow" is a uniquely classified data traffic using multiple fields of a packet's header. A flow is a "broken flow", roughly speaking, if any packets belonging to it are placed on a different fabric port from those that preceded it. In describing the various embodiments of the invention, the terms "flow" and "IP flow" are synonymous with each other.

In at least one embodiment of the invention, a flow can be defined as stream of IP packets that have the same three-tuple header fields. The three-tuple header fields considered are the Source IP Address, the Source Port ID and the Protocol. These fields add up to a total of 56 bits (Source IP address is 32 bits, Source Port ID is 16 bits and Protocol is 8 bits) in current IP standards. A classification scheme based on this definition will identify unique IP flows coming from an IP source and will distinguish between different IP flows originating from behind a NAT (Network Address Translation) gateway. IP flows may thus also be distinguishable by the transport mechanism used (such as TCP, UDP, ICMP (Internet Control Messaging Protocol) etc.). The classification scheme can be further extended to include more fields as necessary. The exemplary port selection algorithm shown in FIG. 3 will apply to any classification scheme.

The exemplary port selection algorithm described herein takes into account the flow identifier. Assuming the router port under consideration is OC48c which will then be load balanced across four OC12c fabric ports, and the fact that most of the IP flows coming from unique IP sources will not exceed OC12c rate, the design load balances at this flow granularity. Under test conditions where one could use test equipment to inject a single flow at excess of OC12c rate, the algorithm will break the flow onto different fabric ports. For example, testing equipment can be used to inject a single flow consuming the entire OC48c bandwidth. Under these test conditions, the algorithm will force the breaking up of single flow onto the four fabric ports.

The algorithm keeps track of the following information:
1) History of preceding flows sent to a fabric port. A storage element called a flow history table tracks the last N distinct or similar flows sent to that fabric port. The history table contains the flow details such as the three-tuple field bits or flow identifier bits. The flow history table operates in a FIFO (First-In First-Out) fashion and has a programmable depth.

2) Queue threshold information. Queue threshold information will indicate if a particular queue is getting near full and whether if adding another packet to that queue will create an overflow condition. Queue threshold information can also be used to derive how much queue space is available at the fabric port., 3) Set of matched ports. All the fabric ports whose flow history table has at least one matching entry with the current flow that needs to selected.

4) Set of non-matched ports. All the fabric ports whose flow history table does not have any matching entry with the current flow.

The port selection algorithm works as follows:
1. For each packet that belongs to a flow, if any fabric port has serviced the same flow in the last 32 packets, then send the packet to the same fabric port. The number 32 is picked arbitrarily and this number is made programmable and can be changed dynamically if needed. This match is determined by running the current flow identifier value with those in the flow history table of every fabric port.
   (a) If the queue for the matching fabric port under consideration has reached a given threshold, put the packet in the queue of the next available fabric port among the set of matched ports. The threshold is a reference value that gives an indication of current queue depth for that particular fabric port.
   (b) If the packet flow identifier matches multiple fabric ports then the packet is sent to the fabric port whose queue has the largest buffer remaining available (i.e. unused).
   (c) If all the matched fabric ports have reached the threshold, then select the unmatched fabric port whose queue has the largest buffer remaining available.
   Once a fabric port is selected, the flow identifier bits for the packet are added to the flow history table entry associated with the selected fabric port.
2. If there is no match in the last 32 packets of any fabric port (no matching fabric ports), find an unmatched fabric port whose queue has the largest buffer available. Select that fabric port for this packet and add the flow identifier bits of this packet to the flow history table entry associated with the selected fabric port.

If all fabric ports (matched and unmatched) have reached their thresholds, then the load balancing system drops the packet. This is a degenerate case where the entire network device is not able to process the packets at even the line rate of the fabric ports. However, if the router is supposed to be non-blocking i.e. will never block or drop traffic passing through, this requires that all the router's sub-systems, including the switch fabric sub-system, should also be non-blocking. In such routers, there should be enough temporary buffering available for the queues of the fabric ports so that a degenerate blocking case would not occur.

The algorithm maintains separate counters that track the queue buffer space available for each port. These counters are always compared to a programmable threshold. The counter value is incremented (by the packet size in bytes) when a packet is sent to a fabric port and is decremented at the line rate (measured, for example, in bytes) of the fabric port at every clock tick. The threshold is a reference that indicates the queues at the port has reached a full condition.

As shown in FIG. 3, such an algorithm is initiated when a packet ingresses into the load balancing system. When a packet enters the load balancing system, a look-up for each fabric port's entry in the flow history table is performed in order to find a match of the flow with the preceding 32 packets (step 310). Then, next the set_of_matches (the set_of_matches is the set of all ports where a match occurred) and set_of_nonmatches (set_of_nonmatches is a set of all ports where this packet was not seen in the flow history table for those ports) is obtained (step 315). Two variables, a variable X which tracks the number of elements in the set_of_matches set and a variable Z which tracks the number of elements in the set_of_nonmatches set are defined (step 320).

The algorithm can be split into a consideration of matching ports, if any, followed by a consideration of non-matching ports until a switch port can be selected. A fabric port is selected if it meets certain conditions.

At step 325, an initial check is made to see if there are any matches, i.e. if there are any ports with matching flows at all. If so, all the matched ports are considered until a matched port can be selected. This matched port consideration process is represented by blocks 330, 335, 340 and 345. For each matched port, then, a check is performed to see whether the port's queue has reached its threshold (step 335). If so, then the tracking variable X for the number of matches is decremented (step 345) since this particular port's queue is full, there is now one less port in the to consider for selection. If the port's queue has not exceeded its threshold, then the port is considered for selection if the buffer left is greater than the previously tested matched port (step 340). Since one less matched port is being considered, the tracking ,variable X is again decremented (step 345). After the decrementing step 345, flow returns to step 330 checking to see whether X is still positive (i.e. there are matched ports left to consider). This loop (steps 330, 335, 340 and 345) has the effect of selecting the matched port that has the largest queue buffer space among all matched ports.

If the number of matched ports is zero or if no matched ports were selected (checked at step 350) (because their queues exceeded thresholds), then non-matched ports, if any, are tested for selection. The non-matched ports are tested for selection in a manner similar to the matched ports. The control loop for testing and considering the non-matched ports consists of steps 360, 365, 370 and 390. First, a check is made to see if there are non-matches (or to see if Z is greater than zero) according to step 360 (i.e. whether any ports do not have the particular flow in their respective entry in the flow history table. If Z is not greater than zero (i.e. all matched ports have been considered), then a check is made to see whether any non-matched port has been selected (step 355). If no port had already been selected, then the packet is dropped according to step 385 and the next packet is fetched into the load balancing system (and the port selection is reinitiated at step 310 for the newly fetched packet). If a port was previously selected then steps 375 and 380, discussed in greater detail below, (related to finalizing of the packet selection process) are performed.

If Z is greater than zero, then according to step 365, a check is made to see whether the port being tested has reached its threshold. If the port has reached its threshold, it is not considered further and thus, according to step 390, the tracking variable Z is decremented. Flow then returns step 360. If the queue of the port being tested has more buffer space available than a previously tested non-matched port, then the port can be considered for selection (step 370). Step 370 is repeated for all non-matched ports whose queues have not reached their thresholds. The effect of testing is to select the non-matched port which has the largest queue buffer space available.

Figure 5:
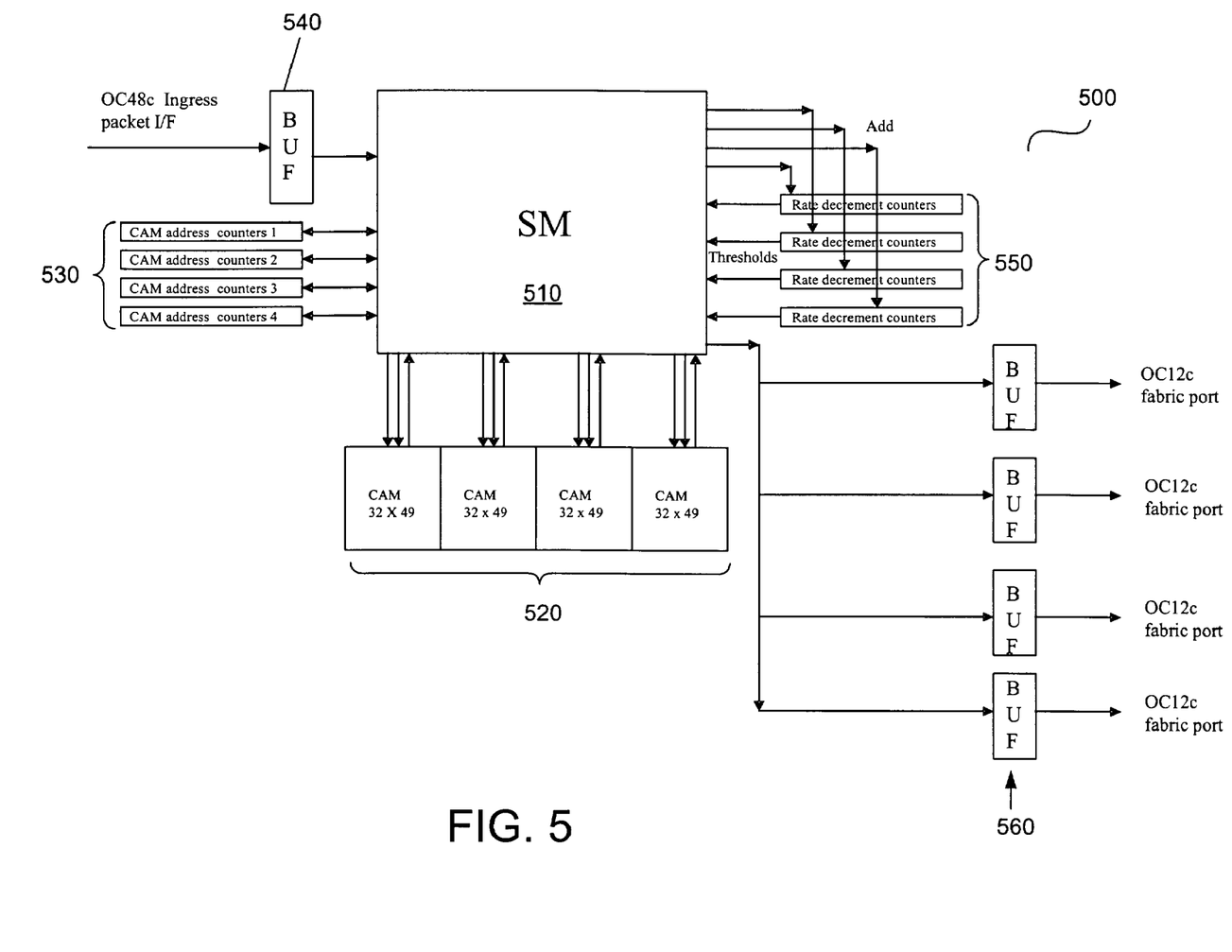
FIG. 5 illustrates an exemplary implementation of a load balancing system according to at least one embodiment of the invention.

If either matched or non-matched port has been selected, then finalizing steps 375 and 380 are performed. First, according to finalizing step 375 the packet flow identifier is added into the flow history table of the corresponding port, and the counter for the port is incremented by the packet size in bytes. FIG. 5 and the associated description below details this operation. Finally, according to step 380, the size of the packet is added to the threshold counter for the queue associated with the selected port. This increase in the threshold counter corresponds to the increase in usage of the buffer queue associated with the selected port.

In conjunction with various embodiments of the invention, an exemplary flow history table for four fabric ports is shown below:

| Port # | History |
| --- | --- |
| 1 | A, B, A, A, A, B . . . |
| 2 | B, C, C, C, C, C . . . |
| 3 | B, B, B, B, B, B . . . |
| 4 | D, D, D, D, E, E . . . |

In the above table, designators "A", "B", "C", "D" and "E" each represent flow identifier of different IP flows. The history of flows at each port is maintained by associating the port number with a list of flow identifiers that identify the flows that have occurred there. In one embodiment, the flow history table is maintained in a FIFO fashion, such that the last element of a list represents the most recent flow. Port #1, as shown, have had flows identified B and A occurring previously. Port #2 also has a flow identified as B occurring as well. This implies that flow B is a "broken" flow, even though port #3 contains only flow B. Flows A, C, D and E are not broken.

Figure 4:
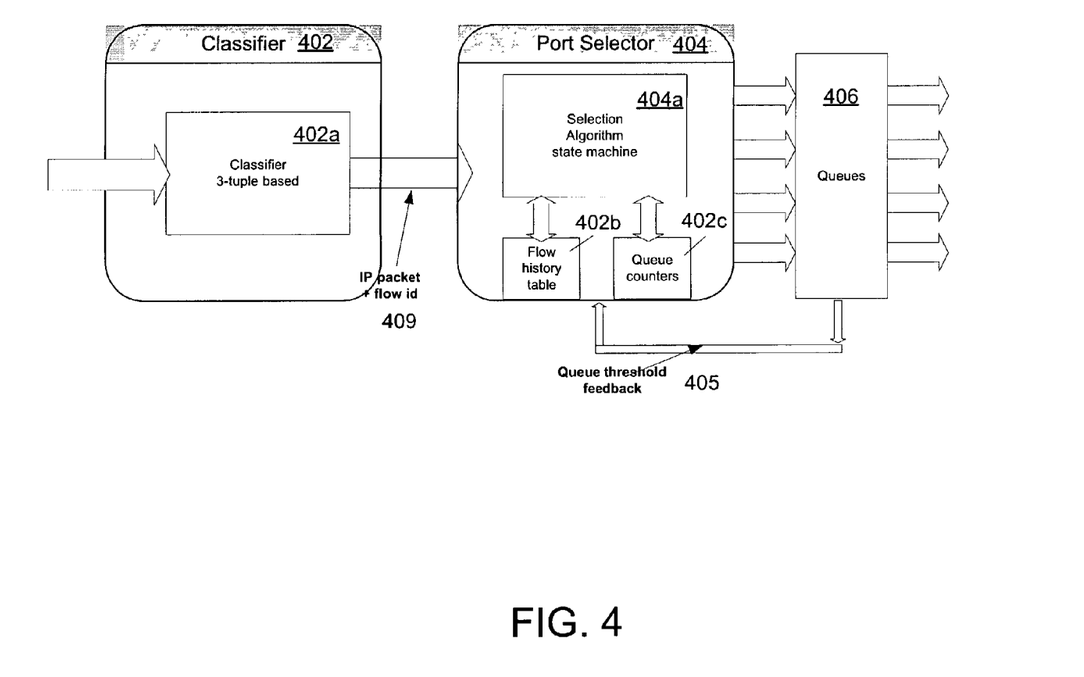
FIG. 4 illustrates a detailed view of a load balancing system according to at least one embodiment of the invention.
Figure 7:
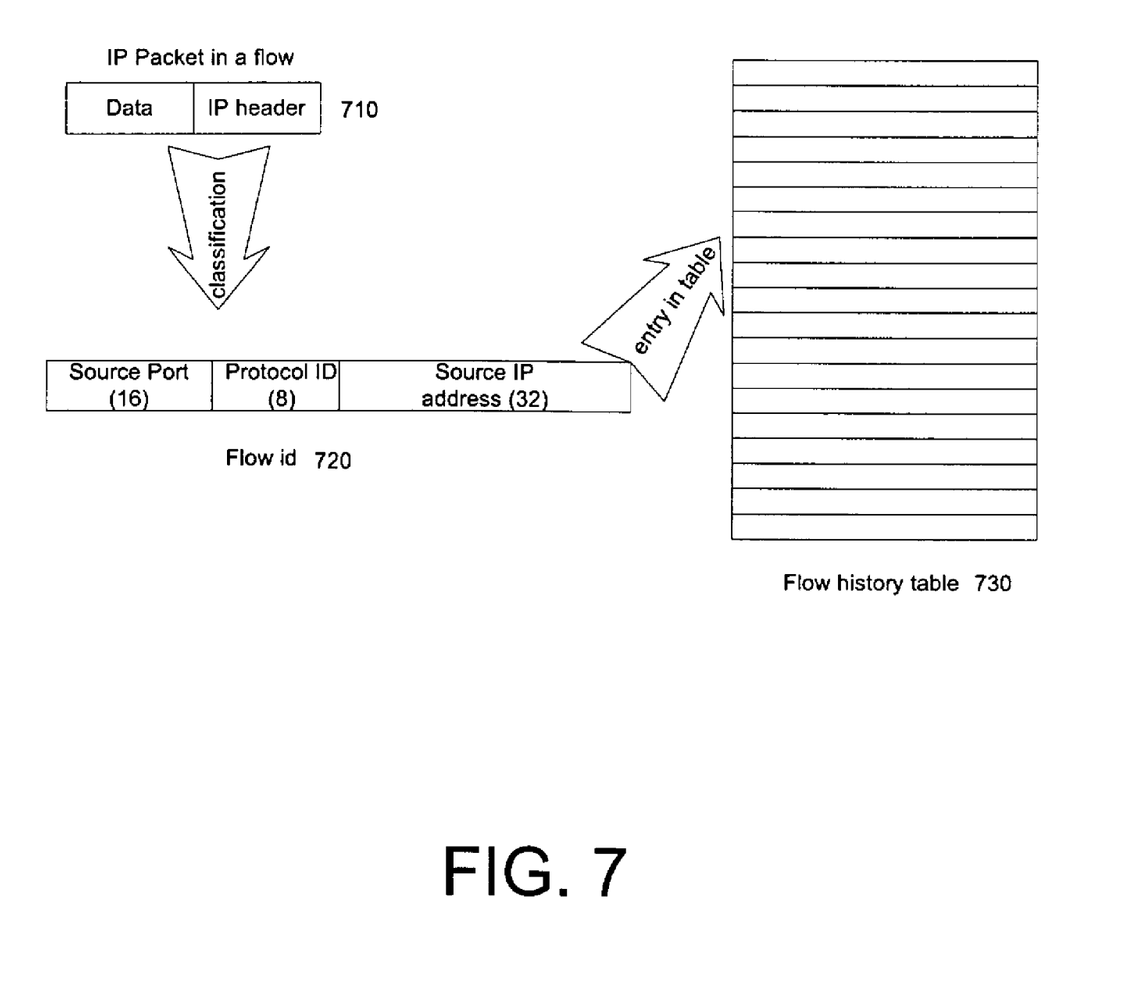
FIG. 7 illustrates flow identifiers and a flow history table utilized in at least one embodiment of the invention.

FIG. 4 illustrates a detailed view of a load balancing system according to at least one embodiment of the invention. The classifier 402 consists of a three-tuple based classifier engine 402a. The classifier engine 402a generates a flow identifier 409 based upon an incoming packet's header fields (such as IP header fields). In at least one embodiment of the invention, the flow identifier 409 is composed of Source Port, Protocol ID and Source IP fields as shown in FIG. 7.

The flow identifier 409 along with the packet itself is forwarded to a port selector 404. Port selector 404 consists of a Selection Algorithm state machine 404a, a flow history table 404b and queue counters 404c. The flow history table 404b is queried by the state machine 404a to determine if the flow to which the incoming packet belongs has been previously routed through one or more of the ports. The flow identifier is compared by the state machine 404a with the entries in the flow history table 404b for producing a set of matches and non-matches. Then, the set of matching ports are traversed, one by one, by the state machine 404a until a port that has available queue space is located. This is achieved by the state machine 404a querying the respective queue counter of queue counters 404c for the given port. The queue threshold is a programmable value that can be changed if needed. When a port can be selected, the packet is forward to the queue of the set of queues 406 which corresponds to the selected port.

In order for a port to be selected, however, the following conditions must occur. The Selection Algorithm state machine 404a will read matching entries from flow history table stored in 402b. Once a determination is made on the set of matched ports and non matched ports, the selection algorithm 404a goes through its selection decisions. The counters maintained in 402c which are indicative of the value of queue depth at the fabric ports are read during the selection process. Once the state machine makes its selection process as defined in FIG. 3 it forwards the packet to fabric queues in 406.

FIG. 5 illustrates an exemplary implementation of a load balancing system according to at least one embodiment of the invention. The load balancing system 500 shown in FIG. 5 is implemented using an FPGA (Field Programmable Grid Array). Both the classifier and the port selector can be implemented in hardware. The flow history table can be maintained in a Content Addressable Memory (CAM). The port selection algorithm can implemented by a state machine. The following is a high level implementation. For small amount of CAM memory it can be replaced with on chip registers or CAM.

The classifier and the port selection algorithm mentioned above with regard to FIG. 3 above and FIG. 7 below is implemented in SM (State Machine) block 510. Packets enter SM block 510 though a temporary buffer 540. When the SM block 510 is ready to accept the next packet, it will read from this buffer and will generate a corresponding 56-bit flow identifier. The port selection algorithm then is activated on the packet and the flow id. SM block 510 maintains the flow history table for each port inside the CAMs 520. CAMs 520 are partitioned into four segments—one for each port. The flow identifier of the current packet is presented to each CAM segment to determine if there is a match. The response from the CAMs 520 will indicate if there is a match and the address within the CAMs 520 where the match occurred. The entries in the flow history table are maintained in a FIFO fashion. The FIFO operation of the flow history table is also managed by SM block 510.

There are four separate CAM address counters 530 implemented for each of the four ports. When a flow identifier does not match any of the flow table entries it has to be added to the selected flow table for the port that is selected to handle the packet with that flow identifier. This flow table is stored in the corresponding CAM segment of CAMs 520 for that port. The counters 530 keep track of the next address where a new flow identifier has to be added into the selected one of the CAMs 520. In addition, SM block 510 also keeps track of the current queue, depth at the fabric ports through threshold counters 550. There is a separate threshold counter in threshold counters 550 for each fabric (switch) port. The counters 550 are operated by a clock source and are decremented at each clock positive of negative edge. The clock period is selected such that it represents an elapsed time or transmission time of one byte through the corresponding fabric (switch) port. The counters 550 can be initialized with a count value from which it will start decrementing. When a fabric (switch) port is selected for the packet, its corresponding threshold counter is read and a new count value is determined. The packet size in bytes is then added to the current counter value and this new count value is loaded back to the counter 550 for the corresponding port. The threshold counter value at any given time represents the queue depth in bytes at the fabric (switch) port. Once a port selection is made, the packet is transmitted to port queues 560 before being placed on the fabric ports.

In one implementation, the algorithm is modeled in Verilog language for simulating the load balancing design. The simulator uses an OC48c as a physical port with four OC12c fabric port interfaces as shown in FIG. 5. The following are the variables used in the algorithm:
  Packet size
  Number of flows
  Inter-packet Gap. The time gap between two packets coming into the edge router port.
  Output buffer lengths/Thresholds
  CAM depth Packet size and Inter-packet Gap (time between packets (i.e. throughout) will impact the line rate processing requirements. Varying the Packet size and Inter-packet Gap will vary the packet rate on the OC48c port. The number of flows injected into the OC48c port is varied to measure if there are any flows that are broken across multiple fabric ports. This is an indicator of whether packets may be delivered to destination out of order. For randomly distributed flow identifiers, if the number is greater than equal to four (for an OC48c line rate) then none of the flows are broken across different ports. Increasing the port queue buffer lengths will reduce the number of flows that are broken. The CAM depth is a measure of latency through the switching system.

Figure 6:
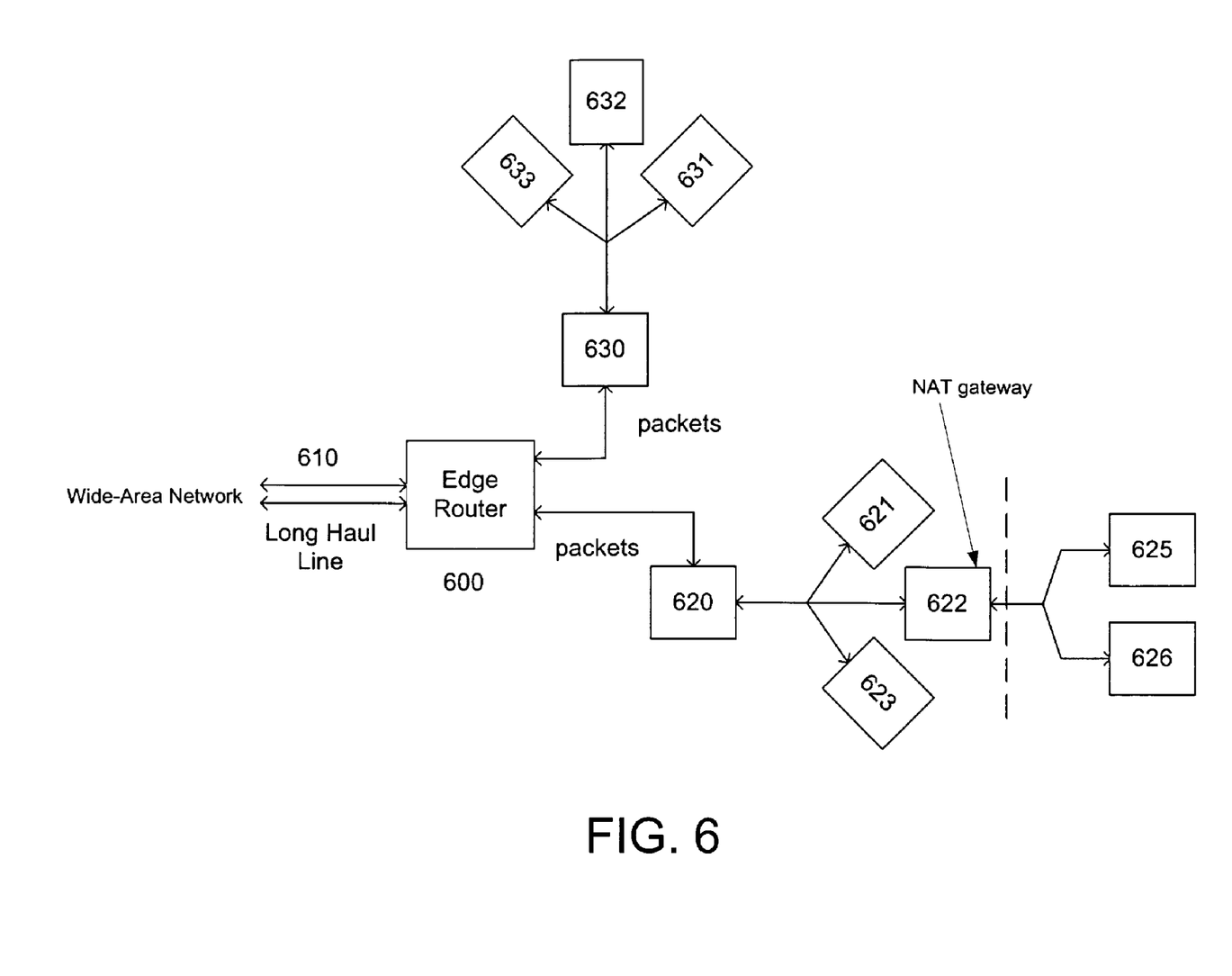
FIG. 6 illustrates an exemplary network whose packets can be processed by the load balancing system presented in various embodiments of the invention.

FIG. 6 illustrates an exemplary network whose packets can be processed by the load balancing system presented in various embodiments of the invention. An edge router 600 sits at the edge of a long-haul network 610 and services a plurality of different subscriber networks 620 and 630. Subscriber networks 620 and 630 aggregate access to a wide area network such as the Internet, which may be provided by one or more edge routers connected to one or more long-haul networks (i.e. backbones). This aggregated access is then provided to individual subscribers or customers which have network capable devices such as local-area-network routers, or individual computer systems.

Subscriber network 620 serves subscribers 621, 623 and 622. Subscriber 622 is shown running a NAT (Network Address Translation) gateway which is hardware/software that lets a single or a few multiple subscriber assigned IP addresses be shared by multiple networkable devices. Thus, the NAT of subscriber 622 is shown as providing for sharing the network resource (i.e. the IP address and the bandwidth allocated to it) provided by subscriber network 620. The NAT gateway running on subscriber 622 allows two other devices 624 and 625, such as laptops, wireless access points, routers, or computers, to share the network resource and IP address. IP addresses are categorized as Private IP addresses and Public IP addresses. Private IP addresses are used internal to an organization and Public IP addresses are reachable in WAN and external networks. NAT gateways maps and converts one or more Public IP addresses to/from many Private IP addresses.

Devices 624 and 625 are addressable through private IP addresses which are visible only to the NAT gateway running on subscriber 622. For packets crossing the device 622, the NAT gateway running thereon will perform address and/or port translation. Packets from devices 624 and 625 bound for the WAN will carry their private addresses. When they reach the NAT gateway, the gateway translates the private source IP address to a public subscriber IP address. In cases where there is only one public IP address available for device 622, a unique value is used to replace for the source port in the packet to distinguish between devices 624 and 625. The mapping of the old value to the new is maintained by the NAT gateway. The mapping is again used for incoming packets to determine the destination and appropriate route to either 622 or 624. Subscriber network 630 serves subscribers 631, 632 and 633 none of which may have a NAT.

The edge router 600 includes a load balancing system in accordance with various embodiments of the invention. The load balancing system allows the edge router to interface to a higher bandwidth network line such as OC48 while using only OC12-capable internal components. The load balancing system classifies into IP flows the packets coming from and going to the subscriber networks 620 and 630. Each of the subscribers 631, 632 and 633 serviced by subscriber network 630 will for instance have their flow identifiers assigned to packets originating therefrom. So packets originating from subscriber 631 will have one flow identifier, while packets originating from subscriber 632 will have another different flow identifier and so on. This is because the combination of parameters used for classification, namely, the IP address, Source Port ID and Protocol. In the case of subscriber network 620, even flows originating behind the NAT running on subscriber 622 will have their own flow identifiers. This is because, in addition to the IP address, the Source Port ID is also provided, which would be unique to each networked device behind and including the NAT on subscriber 622. Thus, devices 624 and 625 will each have a unique flow identifier for packets that originate therefrom even though the subscriber network 620 assigned only one physical IP address.

FIG. 7 illustrates flow identifiers and a flow history table utilized in at least one embodiment of the invention. An IP packet 710 which ingresses into the network device containing the load balancing system of the invention can be examined in terms of a Data portion and an IP Header portion. A classification is derived by extracting from the IP Header portion of packet 710 a series of fields. In one embodiment of the invention, these fields include the Source IP Address, Source Port ID and Protocol ID. The Source IP Address contains 32 bits of information, while the Source Port ID contains 16 bits and the Protocol ID contains 8 bits. These values are concatenated to form a 56 bit flow id (identifier) 720. The flow id 720 is then written to a flow history table 730 in the entry of the table storing the flow ids of packets occurring at the same fabric (switch) port that packet 710 is destined for. The flow history table 730 will thus contain a running list of flow ids for each of the fabric ports in the system.

What is claimed is:

1. An apparatus for load balancing packets within a network device, said network device having a plurality of network device sub-systems, each said sub-system having at least one network device system port and a plurality of fabric ports, said fabric ports connecting said each sub-system with others of said sub-systems within said network device, said apparatus comprising:
   a classifier, said classifier configured to associate each of said packets with a flow identifier, said flow identifier indicating a network flow to which each of said packets belongs;
   a plurality of queues, each of said fabric ports having one of said queues associated therewith, each said queue having a status which includes a queue threshold;
   a flow history table maintaining the history of flows associated with each said fabric port; and
   a port selector, said port selector using the flow identifier, the flow history table and said status to forward each of said packets to one of said fabric ports via its associated queue.

2. An apparatus according to claim 1 wherein said fabric ports operate at a lower maximum speed than said network device system ports.

3. An apparatus according to claim 1 wherein said flow identifier distinguishes among flows originating behind a network address translation gateway.

4. An apparatus according to claim 3 wherein said flow identifier is generated using a plurality of header fields belonging to said each packet.

5. An apparatus according to claim 4 wherein said header fields includes at least one of an Internet Protocol address, a Source Port ID, and a Protocol.

6. An apparatus according to claim 1 wherein said port selector comprises:
   a selection algorithm state machine, said state machine configured to test conditions at said fabric ports and their associated queues, said testing assisting said port selector in determining which of said fabric ports can be selected for said packet.

7. An apparatus according to claim 1 wherein said network device sub-system includes a line card sub-system.

8. An apparatus according to claim 1 wherein said network device includes a service processing card sub-system.

9. An apparatus according to claim 1 wherein said network device is an edge router.

10. An apparatus according to claim 1 wherein said queue threshold is programmable.

11. An apparatus according to claim 1 wherein said flow history table has a programmable depth.

12. An apparatus according to claim 1 wherein said queue counters track the level of utilization of each of said queues.

13. An apparatus according to claim 1 wherein said port selector receives a queue threshold feedback signal from said queues to determine which port's queue buffers are available.

14. An apparatus according to claim 1 wherein flow history table is implemented as a content addressable memory.

15. An apparatus according to claim 14 wherein said content addressable memory is segmented, each segment corresponding to one of said fabric ports, each segment storing the flow history of packets occurring at the switch port to which it corresponds.

16. A method for load balancing packets within a network device, said network device having a plurality of network device sub-systems, each said sub-system having at least one network device system port and a plurality of fabric ports, said fabric ports connecting said each sub-system with others of said sub-systems within said network device, said method comprising:
   classifying each of said packets according to a network flow to which they belong, all packets of the same network flow classified identically; and
   selecting one of said fabric ports for sending said classified packet from the network device sub-system containing the one said fabric port, further said fabric ports having a lower maximum operating speed than said at least one network device system port maintaining a flow history table, said flow history table containing a history of previous network flows at each of said fabric ports; and
   maintaining a plurality of queue counters, each of said queue counters associated with one said queue, said queue counters tracking the space utilized by packets in said associated queue.

17. A method according to claim 16 wherein said considering includes:

finding a set of matching fabric ports, any of said fabric ports determined to be matching if that fabric port has previously serviced packets belonging to the same network flow; and finding a set of non-matching switch ports, said non-matching switch ports all those switch ports not found in said set of matching switch ports.

18. A method according to claim 17 wherein said selecting includes:

considering one of said matching fabric ports for selection;

examining the queue counter corresponding to the queue associated with the considered matching fabric port;

repeating the steps of examining and considering until a selection condition becomes true; and setting for said selecting the matching fabric port upon which said selection condition became true.

19. A method according to claim 18 wherein said selection condition is true when the matching fabric port with the largest available space in the queue associated therewith is found among all said queues associated with all said considered matching fabric ports, said selection condition not true if said queue associated therewith has passed a predetermined threshold.

20. A method according to claim 18 wherein if said selection condition does not become true for any of said matching fabric ports, then said selecting further includes:

considering one of said non-matching fabric ports for selection;

examining the queue counter, corresponding to the queue associated with the considered non-matching fabric port;

repeating the steps of examining and considering until a selection condition becomes true, said selection condition becoming true when the non-matching fabric port with the largest available space in the queue associated therewith is found among all said queues associated with all said considered non-matching fabric ports, said selection condition not true if said queue associated therewith has passed a predetermined threshold; and setting for said selecting the non-matching fabric port upon which said selection condition became true.

21. A method according to claim 20 wherein if all ports have reached their threshold, then said classified packet is dropped from passing through said network device.

22. A method according to claim 18 wherein if the set of matching fabric ports is null, then said selecting further includes:

considering one of said non-matching fabric ports for selection;

examining the queue counter corresponding to the queue associated with the considered non-matching fabric port;

repeating the steps of examining and considering until a selection condition becomes true, said selection condition becoming true when the fabric port with the largest available space in the queue associated therewith is found among all said queues associated with all said considered non-matching fabric ports, said selection condition not true if said queue associated therewith has passed a predetermined threshold; and setting for said selecting the non-matching egress fabric port upon which said selection condition became true.

23. A method according to claim 20 wherein if all ports have reached their threshold, then said classified packet is dropped from said network device.

24. A method according to claim 16 wherein said classifying includes:

obtaining header fields for said classified packet; and generating a flow identifier from said header fields.

25. A method according to claim 16 wherein maintaining said flow history table includes:

adding said flow identifier for said classified packet to the flow history table in the entry corresponding to said selected fabric port.

26. A method according to claim 16 wherein maintaining said queue counters includes:

incrementing the queue counter corresponding to the queue of the selected port; and decrementing each queue counter at the line rate of said egress fabric ports for every clock tick.

* * * * *